(12) United States Patent
Leone (10) Patent No.: US 8,479,849 B2
(45) Date of Patent: *Jul. 9, 2013

(54) PLUG-IN HYBRID ELECTRIC VEHICLE

(75) Inventor: Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/472,225

(22) Filed: May 15, 2012

(65) Prior Publication Data

US 2012/0226404 A1 Sep. 6, 2012

Related U.S. Application Data (63) Continuation of application No. 12/474,091, filed on May 28, 2009, now Pat. No. 8,177,006.

(51) Int. Cl.
*B60W 10/06* (2006.01)
*B60W 10/08* (2006.01)
*B60W 10/26* (2006.01)
*B60W 20/00* (2006.01)

(52) U.S. Cl.
USPC ............... 180/65.28; 180/65.23; 180/65.265; 180/65.285; 180/65.29

(58) Field of Classification Search
USPC ............. 180/65.21, 65.23, 65.24, 65.265, 180/65.275, 65.28, 65.285, 65.29, 65.31
See application file for complete search history.

(56) References Cited

U.S. PATENT DOCUMENTS

| 3,714,823 | A | 2/1973 | Wilkens et al. |
|---|---|---|---|
| 3,724,481 | A | 4/1973 | Schutzenauer |
| 4,271,408 | A | 6/1981 | Teshima et al. |
| 4,857,920 | A | 8/1989 | Kataoka et al. |
| 5,537,982 | A | 7/1996 | Milunas et al. |
| 5,786,640 | A | 7/1998 | Sakai et al. |
| 5,878,727 | A | 3/1999 | Huls |
| 5,898,381 | A | 4/1999 | Gartner et al. |
| 6,054,932 | A | 4/2000 | Gartner et al. |
| 6,109,225 | A | 8/2000 | Ogita et al. |
| 6,137,250 | A | 10/2000 | Hirano et al. |
| 6,321,735 | B2 | 11/2001 | Grieve et al. |
| 6,336,063 | B1 | 1/2002 | Lennevi |
| 6,474,148 | B2 | 11/2002 | Takagi et al. |
| 6,554,088 | B2 | 4/2003 | Severinsky et al. |
| 6,653,002 | B1 | 11/2003 | Parise |
| 6,704,638 | B2 | 3/2004 | Livshiz et al. |
| 6,712,503 | B2 | 3/2004 | Lin et al. |
| 6,817,342 | B2 | 11/2004 | Schule |
| 6,892,541 | B2 | 5/2005 | Suzuki |

(Continued)

FOREIGN PATENT DOCUMENTS

| EP | 1920985 A1 | 5/2008 |
|---|---|---|
| WO | 2008032494 A1 | 3/2008 |

(Continued)

*Primary Examiner* — John R Olszweski
(74) *Attorney, Agent, or Firm* — Julia Voutyras; Alleman Hall McCoy Russell & Tuttle LLP (57) ABSTRACT

A vehicle propulsion system and a method of its operation are described. As one example, the vehicle propulsion system includes a plug-in hybrid electric vehicle. The method may include starting the engine responsive to different criteria, including criteria related to potential degradation effects that may occur due to excessive durations of engine off vehicle operation.

14 Claims, 6 Drawing Sheets

U.S. PATENT DOCUMENTS

| | | |
|---|---|---|
| 6,935,311 B2 | 8/2005 | Visser et al. |
| 7,000,718 B2 | 2/2006 | Adachi et al. |
| 7,059,313 B2 | 6/2006 | Lippa |
| 7,128,057 B2 | 10/2006 | Wiese et al. |
| 7,161,258 B2 | 1/2007 | Kanai |
| 7,165,447 B2 | 1/2007 | Miyahara et al. |
| 7,185,641 B2 | 3/2007 | Suzuki |
| 7,281,527 B1 | 10/2007 | Bryant |
| 7,331,335 B2 | 2/2008 | Okuda |
| 7,341,048 B2 | 3/2008 | Koyama et al. |
| 7,367,223 B2 | 5/2008 | Kettl et al. |
| 7,389,769 B2 | 6/2008 | Amano et al. |
| 7,506,639 B2 | 3/2009 | Saito |
| 7,520,353 B2 | 4/2009 | Severinsky et al. |
| 7,523,747 B2 | 4/2009 | Gachik et al. |
| 7,565,900 B2 | 7/2009 | Sato et al. |
| 7,640,912 B2 | 1/2010 | Lewis et al. |
| 7,640,914 B2 | 1/2010 | Lewis et al. |
| 7,694,760 B2 | 4/2010 | Leone et al. |
| 7,730,872 B2 | 6/2010 | Leone et al. |
| 7,775,310 B2 | 8/2010 | Andri |
| 7,805,238 B2 | 9/2010 | Andri |
| 7,920,955 B2 | 4/2011 | Bauer et al. |
| 7,980,342 B2 | 7/2011 | Andri |
| 8,047,313 B2 | 11/2011 | Andri |
| 8,136,614 B2 | 3/2012 | Andri |
| 2004/0006414 A1 | 1/2004 | Suzuki |
| 2004/0169489 A1 | 9/2004 | Hobbs |
| 2005/0061563 A1 | 3/2005 | Syed et al. |
| 2005/0133013 A1 | 6/2005 | Lippa |
| 2005/0240336 A1 | 10/2005 | Reddy |
| 2006/0042605 A1 | 3/2006 | Amano et al. |
| 2006/0100057 A1 | 5/2006 | Severinsky et al. |
| 2007/0007056 A1* | 1/2007 | Bowers et al. ............... 180/65.2 |
| 2007/0169971 A1 | 7/2007 | Yamaguchi et al. |
| 2008/0167788 A1 | 7/2008 | Tate et al. |
| 2008/0201058 A1 | 8/2008 | Bryant |
| 2008/0208435 A1 | 8/2008 | Bryant |
| 2008/0215296 A1 | 9/2008 | Craemer et al. |
| 2008/0234915 A1 | 9/2008 | Nomasa et al. |
| 2008/0306672 A1 | 12/2008 | Bauer et al. |
| 2009/0038585 A1 | 2/2009 | Andri |
| 2009/0038586 A1 | 2/2009 | Andri |
| 2009/0071443 A1 | 3/2009 | Miyake et al. |
| 2009/0118883 A1 | 5/2009 | Heap et al. |
| 2009/0139320 A1 | 6/2009 | Bulgrien |
| 2009/0205889 A1 | 8/2009 | Leone |
| 2009/0265081 A1 | 10/2009 | Shibata et al. |
| 2009/0277702 A1 | 11/2009 | Kanada et al. |
| 2009/0292443 A1 | 11/2009 | Stein et al. |
| 2010/0001523 A1 | 1/2010 | Sato et al. |
| 2010/0088008 A1 | 4/2010 | Tanaka et al. |
| 2010/0116245 A1 | 5/2010 | Andri |
| 2010/0147263 A1 | 6/2010 | Russell et al. |
| 2010/0162991 A1 | 7/2010 | Ramappan et al. |
| 2010/0211242 A1 | 8/2010 | Kelty et al. |
| 2012/0029751 A1 | 2/2012 | Andri |

FOREIGN PATENT DOCUMENTS

| | | |
|---|---|---|
| WO | 2008099862 A1 | 8/2008 |
| WO | 2008143310 A1 | 11/2008 |
| WO | 2008143312 A1 | 11/2008 |
| WO | 2008146900 A1 | 12/2008 |

* cited by examiner

PLUG-IN HYBRID ELECTRIC VEHICLE

CROSS REFERENCE TO RELATED APPLICATIONS

The present application is a continuation of U.S. patent application Ser. No. 12/474,091 filed May 28, 2009, which is now U.S. Pat. No. 8,177,006, the entire contents of which are incorporated herein by reference for all purposes.

BACKGROUND AND SUMMARY

A plug-in hybrid electric vehicle has the capability to operate significant distances in pure electric mode, without running the engine to recharge the battery. It is commonly assumed that a plug-in hybrid electric vehicle would run the engine only when necessary to recharge the battery. This may be a good strategy if electricity is much cheaper than gasoline. But it may be desirable to start the engine periodically, regardless of any need for battery charging. For example, some customers may take mostly short trips, and may consistently plug in the vehicle between trips, such that the engine is almost never needed for battery charging.

Long periods of engine inactivity could cause a variety of problems, including water condensation, corrosion, air leakage into hydraulic valvetrain components and/or into the fuel system, oil and/or coolant leakage past rotating seals, "stale" fuel, etc. To avoid these problems, the engine should be started and operated periodically even when it is not required for battery recharging.

The inventors herein have recognized that starting the engine at times other than low battery state of charge may concern the driver as they are not aware of the reason for the engine starting.

In one approach a method is provided for controlling a plug-in hybrid vehicle having an engine, the method carried out by a control system. The method may comprise during a first engine stopped condition, performing a first start of the engine in response to a battery state of charge, where the engine is started during a first state of charge; during a second engine stopped condition, performing a second start of the engine in response an operating parameter, where the engine is started during a second state of charge, the second state of charge higher than the first state of charge; delaying the performing of the second start until a selected event occurs; and performing a first stop of the engine in response to the battery state of charge, where the engine is stopped during a third state of charge higher than the first and second states of charge, The selected conditions may include conditions that mask engine starting and/or continued engine operation, but that also effectively utilize engine output even if battery state of charge is sufficiently high, such as high vehicle speeds, vehicle acceleration, etc. Further, other selected conditions may also be used, such as if the vehicle is traveling on rough roads, high stereo volume in the vehicle, or others, and/or combinations thereof.

In this way, engine starts may be used to address potential degradation that may occur, even if the state of charge does not require engine operation; yet, a high driver perception can be maintained by appropriately delaying the start until the selected conditions occur.

Thus, by delaying the starting of the second, higher state of charge, engine start until the selected conditions are present, it may be possible to better mask the potentially unexpected start from the driver. Additionally, or alternatively, it may be possible to have the engine start repeatedly correlate to consistent conditions so that the driver comes to expect the engine start, even though the battery state of charge is higher than other engine starts.

Note that as used above, the first engine start may occur later in time than the second engine start, or vice versa, and each may occur in a common drive cycle of the vehicle. Further, the first and second engine starts may not occur immediately following one another, and there may be various additional starts occurring before, after, and/or between them.

In another example, a method includes, during vehicle operation, starting and stopping the engine in response to a battery state of charge, where the engine is started during a first state of charge and stopped during a second, higher, state of charge; and requesting a vehicle operator to start the engine in response to selected engine off conditions.

In this way, the operator can exert some control on engine starting to either improve drive feel, and/or to accommodate information only the operator may have, such as how long the drive cycle will last, how far the vehicle will travel in the drive cycle, and/or intended plans for vehicle recharging. However, if the operator fails to initiate the engine for sufficient duration, the method may further include starting the engine even without receiving a driver request to start the engine.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
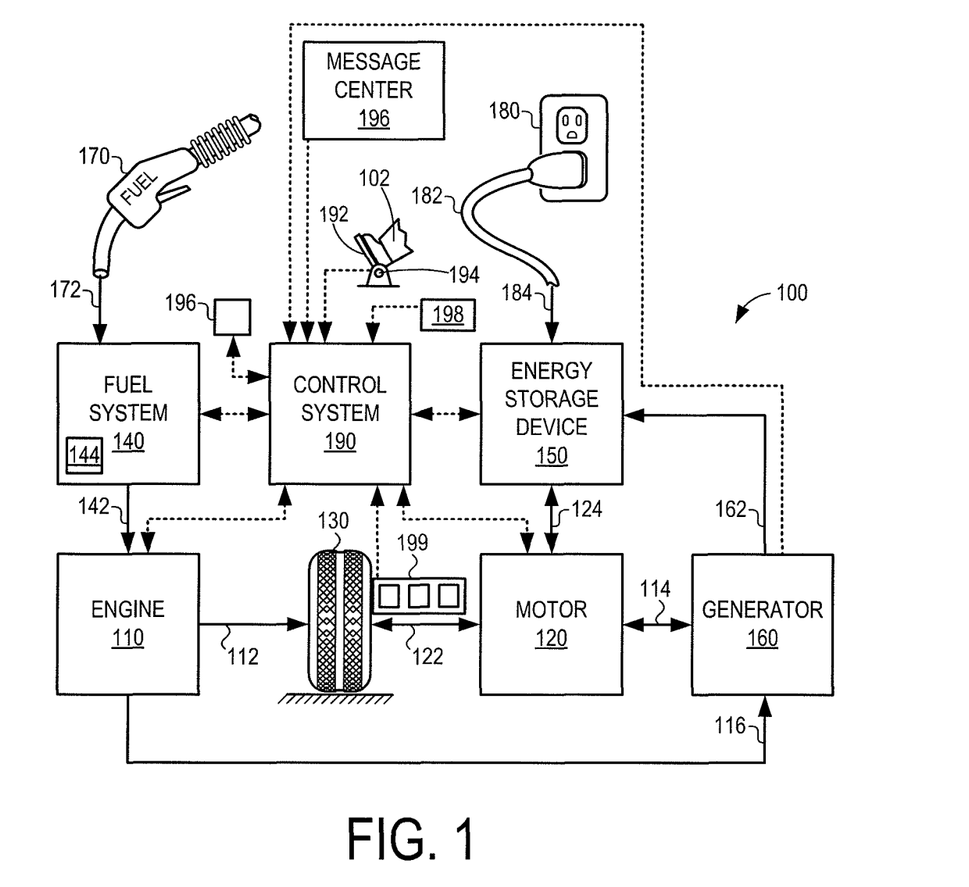
FIG. 1 illustrates an example vehicle propulsion system.
Figure 2:
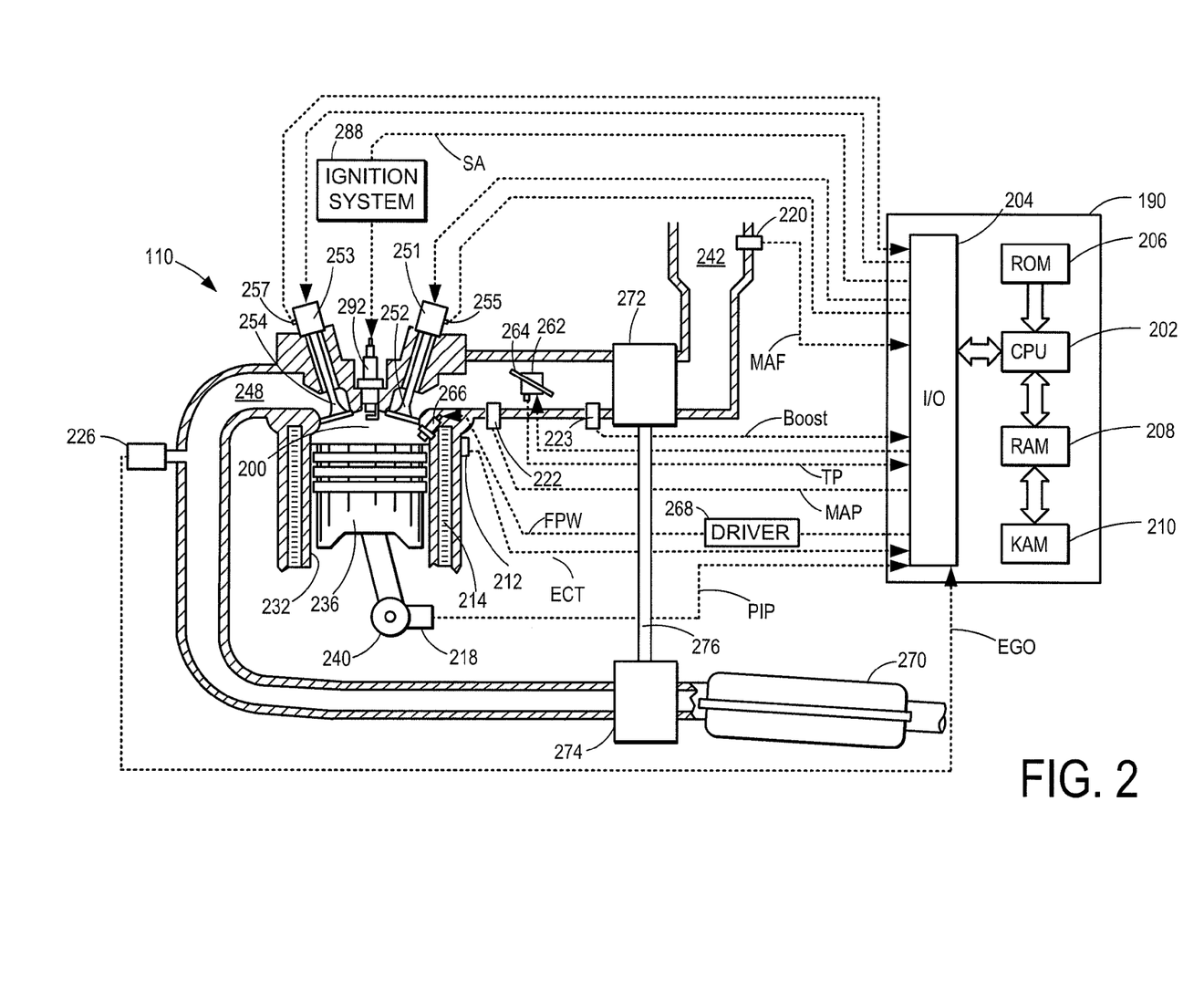
FIG. 2 illustrates an example internal combustion engine.

The following description relates to systems and methods for a plug-in hybrid vehicle, such as shown in FIG. 1, including an internal combustion engine, such as shown in FIG. 2. Example control of engine starting and shutdown is described with regard to FIG. 3, in which different conditions generate engine starts. Under some conditions, engine starts are generated responsive to battery state of charge, whereas under other conditions, engine starts are generated to reduce degrading effects of continued engine off operation, such as when a vehicle is consistently charged and the driver travels only a short distance such that engine operation is not needed to recharge the battery. For example various degrading sets of conditions may occur due to excessive engine off conditions, as described with regard to FIG. 4. When such conditions generate a need for engine operation, the engine start may be delayed until selected conditions, such as those described in FIG. 5, occur, thereby masking the engine start and engine operation from the operator. Finally, once the engine is started to address the potential degradation that would otherwise occur, the engine operation is continued as described in the example of FIG. 6.

FIG. 1 illustrates an example vehicle propulsion system 100. Vehicle propulsion system 100 includes a fuel burning engine 110 and a motor 120. As a non-limiting example, engine 110 comprises an internal combustion engine and motor 12.0 comprises an electric motor. Motor 120 may be configured to utilize or consume a different energy source than engine 110. For example, engine 110 may consume a liquid fuel (e.g. gasoline) to produce an engine output while motor 120 may consume electrical energy to produce a motor output. As such, a vehicle with propulsion system 100 may be referred to as a hybrid electric vehicle (HEV).

Vehicle propulsion system 100 may utilize a variety of different operational modes depending on operating conditions encountered by the vehicle propulsion system. Some of these modes may enable engine 110 to be maintained in an off state (i.e. set to a deactivated state) where combustion of fuel at the engine is discontinued. For example, under select operating conditions, motor 120 may propel the vehicle via drive wheel 130 as indicated by arrow 122 while engine 110 is deactivated.

During other operating conditions, engine 110 may be set to a deactivated state (as described above) while motor 120 may be operated to charge energy storage device 150. For example, motor 120 may receive wheel torque from drive wheel 130 as indicated by arrow 122 where the motor may convert the kinetic energy of the vehicle to electrical energy for storage at energy storage device 150 as indicated by arrow 124. This operation may be referred to as regenerative braking of the vehicle. Thus, motor 120 can provide a generator function in some embodiments. However, in other embodiments, generator 160 may instead receive wheel torque from drive wheel 130, where the generator may convert the kinetic energy of the vehicle to electrical energy for storage at energy storage device 150 as indicated by arrow 162.

During still other operating conditions, engine 110 may be operated by combusting fuel received from fuel system 140 as indicated by arrow 142. For example, engine 110 may be operated to propel the vehicle via drive wheel 130 as indicated by arrow 112 while motor 120 is deactivated. During other operating conditions, both engine 110 and motor 120 may each be operated to propel the vehicle via drive wheel 130 as indicated by arrows 112 and 122, respectively. A configuration where both the engine and the motor may selectively propel the vehicle may be referred to as a parallel type vehicle propulsion system. Note that in some embodiments, motor 120 may propel the vehicle via a first set of drive wheels and engine 110 may propel the vehicle via a second set of drive wheels.

In other embodiments, vehicle propulsion system 100 may be configured as a series type vehicle propulsion system, whereby the engine does not directly propel the drive wheels. Rather, engine 110 may be operated to power motor 120, which may in turn propel the vehicle via drive wheel 130 as indicated by arrow 122. For example, during select operating conditions, engine 110 may drive generator 160, which may in turn supply electrical energy to one or more of motor 120 as indicated by arrow 114 or energy storage device 150 as indicated by arrow 162. As another example, engine 110 may be operated to drive motor 120 which may in turn provide a generator function to convert the engine output to electrical energy, where the electrical energy may be stored at energy storage device 150 for later use by the motor.

As will be described with reference to the process flows of FIGS. 3 and 4, the vehicle propulsion system may be configured to transition between two or more of the operating modes described above depending on operating conditions.

Fuel system 140 may include one or more fuel storage tanks 144 for storing fuel on-board the vehicle. For example, fuel tank 144 may store one or more liquid fuels, including but not limited to: gasoline, diesel, and alcohol fuels. In some examples, the fuel may be stored on-board the vehicle as a blend of two or more different fuels. For example, fuel tank 144 may be configured to store a blend of gasoline and ethanol (e.g. E10, E85, etc.) or a blend of gasoline and methanol (e.g. M10, M85, etc.), whereby these fuels or fuel blends may be delivered to engine 110 as indicated by arrow 142. Still other suitable fuels or fuel blends may be supplied to engine 110, where they may be combusted at the engine to produce an engine output. The engine output may be utilized to propel the vehicle as indicated by arrow 112 or to recharge energy storage device 150 via motor 120 or generator 160.

In some embodiments, energy storage device 150 may be configured to store electrical energy that may be supplied to other electrical loads residing on-board the vehicle (other than the motor), including cabin heating and air conditioning, engine starting, headlights, cabin audio and video systems, etc. As a non-limiting example, energy storage device 150 may include one or more batteries and/or capacitors.

Control system 190 may communicate with one or more of engine 110, motor 120, fuel system 140, energy storage device 150, and generator 160. As will be described by the process flows of FIGS. 3 and 4, control system 190 may receive sensory feedback information from one or more of engine 110, motor 120, fuel system 140, energy storage device 150, and generator 160. Further, control system 190 may send control signals to one or more of engine 110, motor 120, fuel system 140, energy storage device 150, and generator 160 responsive to this sensory feedback. Control system 190 may receive an indication of an operator requested output of the vehicle propulsion system from a vehicle operator 102. For example, control system 190 may receive sensory feedback from pedal position sensor 194 which communicates with pedal 192. Pedal 192 may refer schematically to a brake pedal and/or an accelerator pedal.

Energy storage device 150 may periodically receive electrical energy from a power source 180 residing external to the vehicle (e.g. not part of the vehicle) as indicated by arrow 184. As a non-limiting example, vehicle propulsion system 100 may be configured as a plug-in hybrid electric vehicle (HEV), whereby electrical energy may be supplied to energy storage device 150 from power source 180 via an electrical energy transmission cable 182. During a recharging operation of energy storage device 150 from power source 180, electrical transmission cable 182 may electrically couple energy storage device 150 and power source 180. While the vehicle propulsion system is operated to propel the vehicle, electrical transmission cable 182 may disconnected between power source 180 and energy storage device 150. Control system 190 may identify and/or control the amount of electrical energy stored at the energy storage device, which may be referred to as the state of charge (SOC).

In other embodiments, electrical transmission cable 182 may be omitted, where electrical energy may be received wirelessly at energy storage device 150 from power source 180. For example, energy storage device 150 may receive electrical energy from power source 180 via one or more of electromagnetic induction, radio waves, and electromagnetic resonance. As such, it should be appreciated that any suitable approach may be used for recharging energy storage device 150 from a power source that does not comprise part of the vehicle. In this way, motor 120 may propel the vehicle by utilizing an energy source other than the fuel utilized by engine 110.

Fuel system 140 may periodically receive fuel from a fuel source residing external to the vehicle. As a non-limiting example, vehicle propulsion system 100 may be refueled by receiving fuel via a fuel dispensing device 170 as indicated by arrow 172. In some embodiments, fuel tank 144 may be configured to store the fuel received from fuel dispensing device 170 until it is supplied to engine 110 for combustion. In some embodiments, control system 190 may receive an indication of the level of fuel stored at fuel tank 144 via a fuel level sensor. The level of fuel stored at fuel tank 144 (e.g. as identified by the fuel level sensor) may be communicated to the vehicle operator, for example, via a fuel gauge or indication lamp indicated at 196.

As described herein, engine 110 may be periodically set to a deactivated state where the consumption of fuel at the engine is significantly reduced or discontinued. Where engine 110 is deactivated for extended periods of time, the fuel stored at fuel tank 144 may take a longer time to be depleted by the engine. As the length of time the engine sits without being operated, or without being operated until it is sufficiently warmed, various degrading effects may occur, as described herein with regard to FIG. 4.

As an example, rotating coupling seals may degrade if an oil coating thereon dissipates and humid gasses interact with the components over time.

As another example, cyclical heating and cooling of the fuel stored on-board the vehicle (e.g. at fuel tank 144), which may be caused by heat generated by periodic use of the vehicle and/or by diurnal heating caused by environmental temperature changes, may cause water vapor to condense into the liquid fuel. For example, water vapor that is present in the ullage space of fuel tank 144 during the higher day time temperatures may be condensed into the fuel when the temperature decreases to the lower night time temperatures. This addition of water to the fuel may cause reduced or degraded engine performance. Furthermore, the addition of water to some fuels may increase the rate of fuel separation or stratification of the fuel components. For example, an alcohol component may separate from a hydrocarbon component at a higher rate in the presence of water.

This plug-in hybrid electric vehicle, as described with reference to vehicle propulsion system 100, may be configured to utilize a secondary form of energy (e.g. electrical energy) that is periodically received from an energy source that is not otherwise part of the vehicle.

The vehicle propulsion system 100 may also include a message center 196, ambient temperature/humidity sensor 198, and a roll stability control sensor, such as a lateral and/or longitudinal and/or yaw rate sensor(s) 199. The message center may include indicator light(s) and/or a text-based display in which messages are displayed to an operator, such as a message requesting an operator input to start the engine, as discussed below. The message center may also include various input portions for receiving an operator input, such as buttons, touch screens, voice input/recognition, etc. In an alternative embodiment, the message center may communicate audio messages to the operator without display. Further, the sensor(s) 199 may include a vertical accelerometer to indicate road roughness. These devices may be connected to control system 190. In one example, the control system may adjust engine output and/or the wheel brakes to increase vehicle stability in response to sensor(s) 199.

FIG. 2 illustrates a non-limiting example of a cylinder 200 of engine 110, including the intake and exhaust system components that interface with the cylinder. Note that cylinder 200 may correspond to one of a plurality of engine cylinders. Cylinder 200 is at least partially defined by combustion chamber walls 232 and piston 236. Piston 236 may be coupled to a crankshaft 240 via a connecting rod, along with other pistons of the engine. Crankshaft 240 may be operatively coupled with drive wheel 130, motor 120 or generator 160 via a transmission.

Cylinder 200 may receive intake air via an intake passage 242. Intake passage 242 may also communicate with other cylinders of engine 110. Intake passage 242 may include a throttle 262 including a throttle plate 264 that may be adjusted by control system 190 to vary the flow of intake air that is provided to the engine cylinders. Cylinder 200 can communicate with intake passage 242 via one or more intake valves 252. Cylinder 200 may exhaust products of combustion via an exhaust passage 248. Cylinder 200 can communicate with exhaust passage 248 via one or more exhaust valves 254.

In some embodiments, cylinder 200 may optionally include a spark plug 292, which may be actuated by an ignition system 288. A fuel injector 266 may be provided in the cylinder to deliver fuel directly thereto. However, in other embodiments, the fuel injector may be arranged within intake passage 242 upstream of intake valve 252. Fuel injector 266 may be actuated by a driver 268.

A non-limiting example of control system 190 is depicted schematically in FIG. 2. Control system 190 may include a processing subsystem (CPU) 202, which may include one or more processors. CPU 202 may communicate with memory, including one or more of read-only memory (ROM) 206, random-access memory (RAM) 208, and keep-alive memory (KAM) 210. As a non-limiting example, this memory may store instructions that are executable by the processing subsystem. The process flows, functionality, and methods described herein may be represented as instructions stored at the memory of the control system that may be executed by the processing subsystem.

CPU 202 can communicate with various sensors and actuators of engine 110 via an input/output device 204. As a non-limiting example, these sensors may provide sensory feedback in the form of operating condition information to the control system, and may include: an indication of mass airflow (MAF) through intake passage 242 via sensor 220, an indication of manifold air pressure (MAP) via sensor 222, an indication of throttle position (TP) via throttle 262, an indication of engine coolant temperature (ECT) via sensor 212 which may communicate with coolant passage 214, an indication of engine speed (PIP) via sensor 218, an indication of exhaust gas oxygen content (EGO) via exhaust gas composition sensor 226, an indication of intake valve position via sensor 255, and an indication of exhaust valve position via sensor 257, among others.

Furthermore, the control system may control operation of the engine 110, including cylinder 200 via one or more of the following actuators: driver 268 to vary fuel injection timing and quantity, ignition system 288 to vary spark timing and energy, intake valve actuator 251 to vary intake valve timing, exhaust valve actuator 253 to vary exhaust valve timing, and throttle 262 to vary the position of throttle plate 264, among others. Note that intake and exhaust valve actuators 251 and 253 may include electromagnetic valve actuators (EVA) and/or cam-follower based actuators.

In some embodiments, engine 110 may include a boosting device such as turbocharger or supercharger than may include a compressor 272 and/or a turbine 274 communicating via shaft 276. Exhaust system 248 may include an exhaust aftertreatment system 270.

Figure 3:
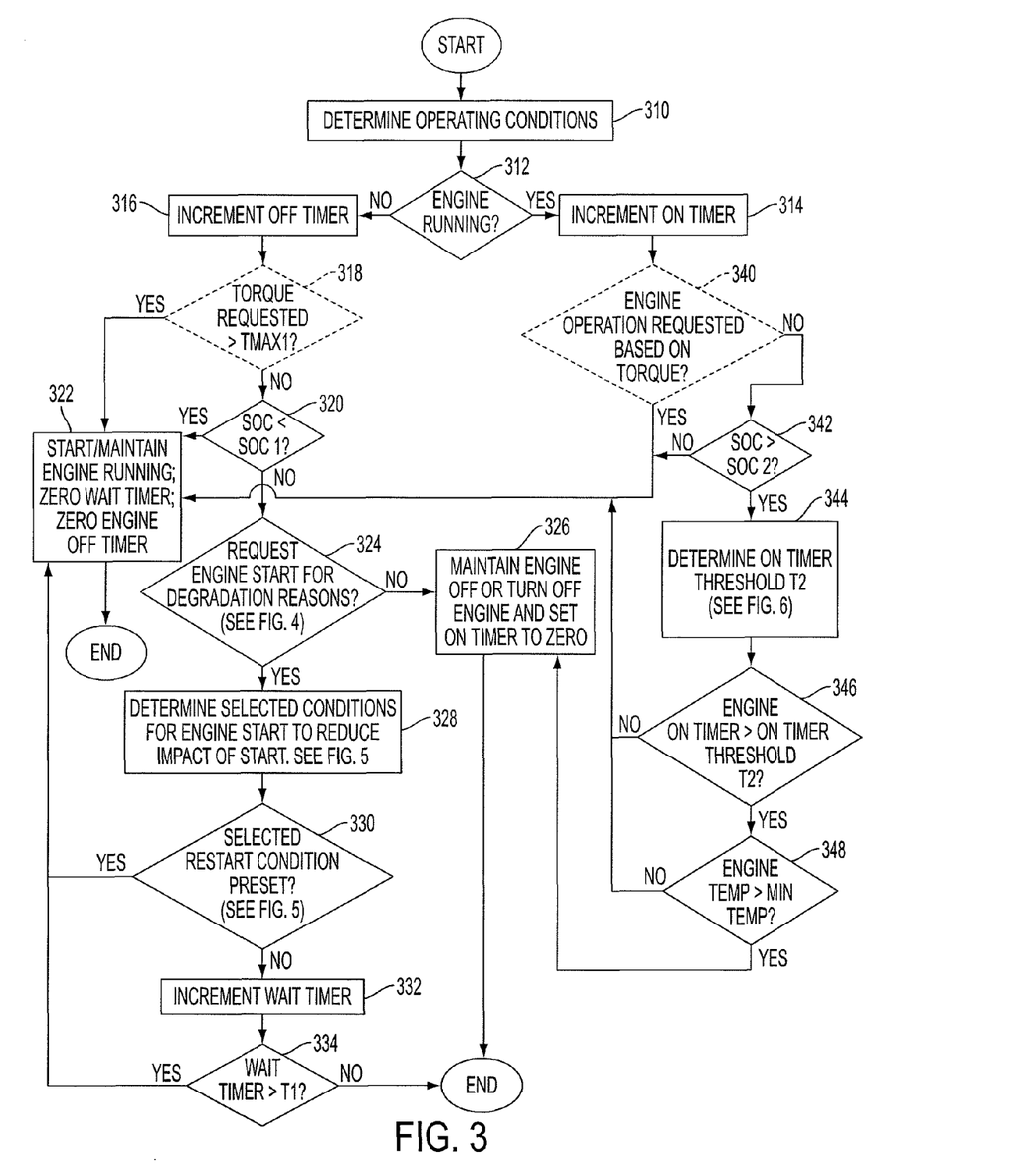
FIGS. 3-6 illustrate example routines.

FIG. 3 illustrates an example routine that may be performed to control the operation of a fuel burning engine, such as engine 110 of FIGS. 1 and 2. Specifically, the control system may carry out the routine during vehicle operation while the vehicle is travelling and/or while the vehicle is on and waiting at a stopped location, such as a stop-light. In one example, the routine controls the vehicle during vehicle operation, including starting and stopping the engine in response to a battery state of charge (e.g., where the engine is started during a first state of charge and stopped during a second, higher, state of charge) and further automatically starting the engine in response to potential degradation condition and/or requesting a vehicle operator to start the engine in response to selected conditions, such as potential degradation during engine off conditions.

Referring now specifically to FIG. 3, at 310, the operating conditions of the vehicle propulsion system may be assessed. For example, control system 190 may receive sensory feedback from one or more sensors associated with the vehicle propulsion system components as described above.

As a non-limiting example, these operating conditions may include one or more of the following: an indication of vehicle operator requested output from the vehicle propulsion system, an indication of fuel level or fuel amount at fuel tank 144, an indication of fuel usage rates by the engine, an indication of state of charge (SOC) of energy storage device 150, ambient conditions including humidity, temperature, etc. and others.

At 312, the routine may determine whether the engine is already running (e.g., whether the engine is spinning under power generated from combustion in the engine). If so, the routine continues to 314 (where the engine on timer is incremented), and if not, the routine continues to 316 (where the engine off timer is incremented).

From 316, the routine continues to 318 to determine whether a driver request (such as a driver-generated vehicle output wheel torque request) is greater than a threshold level TMAX1). Such a determination may be used where the engine is configured to directly provide drive torque to the vehicle propulsion system, and may be omitted when the engine is not so configured, such as in a series hybrid configuration. Thus, FIG. 3 shows 318 as a dashed block.

When the answer to 318 is no, the routine continues to 320 to determine whether the battery state of charge (SOC) is less than a first minimum threshold SOC1. In some examples, SOC1 represents a state of charge below which engine operation is requested to maintain sufficient mobility of the vehicle responsive to the operator commands. The first minimum threshold may be a function of operating conditions of the system, vehicle, and/or battery, such as based on battery temperature, etc. Further, as noted herein, in an alternative embodiment, the first minimum threshold may be adjusted based on various factors relating to degradation due to engine off conditions persisting.

When the answer to either 318 or 320 is yes, the routine continues to 322 where the control system initiates a starting operation of the engine, or maintains operation of the engine if it is already running. Further, the routine zeros the engine off timer and engine wait timer (discussed below herein).

When the answer to 320 is no, the routine continues to 324 to determine whether an engine start is requested due to other reasons, such as degradation related to excessive engine-off conditions. Further details of the various examples of such conditions are described with regard to FIG. 4, for example. If the routine determines that engine operation is not requested, then the routine continues to 326 to maintain the engine in the shut-down, non-combusting condition.

Figure 5:
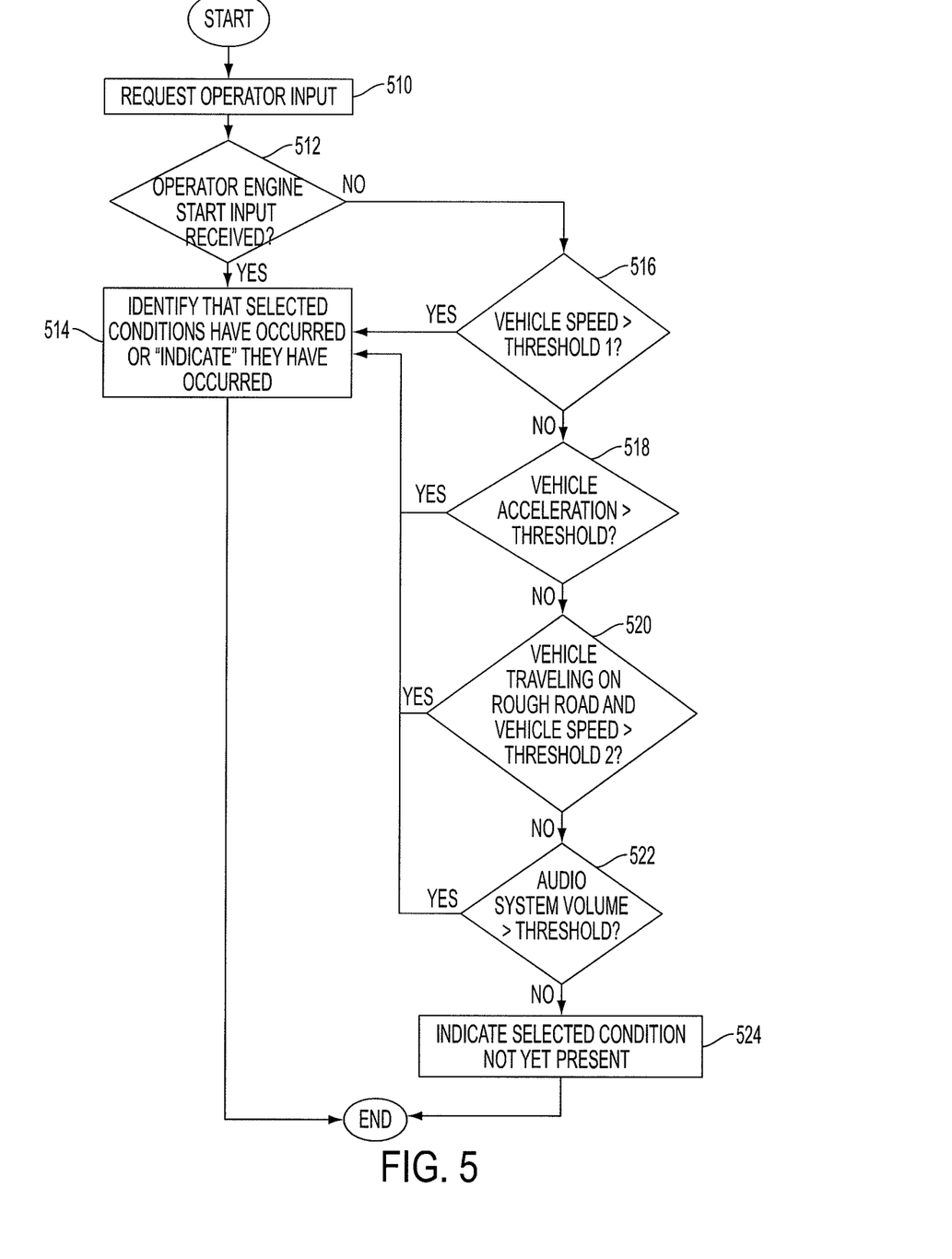

Otherwise, when an engine start and engine operation are requested at 324, the routine continues to 328 to determine selected conditions during which the engine start can be performed with reduced driver perception, or when a start would be expected by the driver, including requesting the driver to input a request to start the engine. The routine then continues to 330 to determine whether such selected conditions are present, and if so, start the engine at 322. FIG. 5 provides additional details of the various selected conditions that may be identified. Otherwise, the routine continues to 332 to increment the wait timer, and then check in at 334 whether the wait timer has exceeded a maximum threshold T1. When either the wait timer is met, or the selected conditions are present, the routine starts the engine at 322.

In this way, it is possible to delay the engine starting, when the engine start is requested based on potential for degradation due to engine off conditions over-persisting. In one particular example, the above operation enables the engine to be started at higher state of charge values when there is an increased potential for degradation related to engine off conditions over-persisting. The delay may be maintained until selected conditions are present, such conditions that may mask the engine starting from the operator, and/or conditions where the operator would already be expecting the engine to start. Further, there may be a maximum limit to the amount of delay accepted so as to provide engine starting to address the potential degradation in the event the selected conditions do not occur. As such, it is possible to address potential degradation due to excessive engine off conditions, while at the same time maintaining high driver comfort.

Returning to the top of FIG. 3, from 314 with the engine running, the routine continues to 340 to determine whether the engine operation is requested based on the driver requested torque. If so, the routine continues to 322 to maintain engine operation. As noted above, the determination of 340 may be omitted, such as in the example of a series hybrid vehicle configuration. Otherwise, the routine continues to 342 to determine whether the state of charge is above the upper threshold SOC2, which may indicate that the battery is fully charged. If not, the routine continues to 322 to maintain engine operation.

Figure 6:
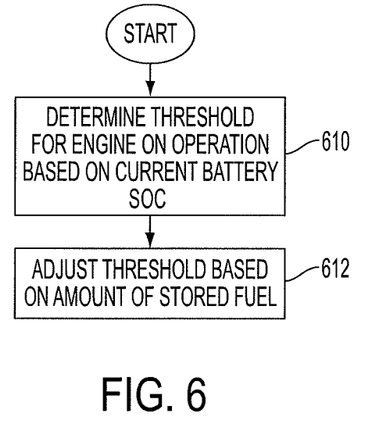

If the answer to 342 is yes, indicating sufficient charging has been completed, the routine continues to 344 to determine an engine on timer threshold T2, as described in further detail with regard to FIG. 6. In one example, the routine determines the desired length of time, miles, etc., for which the engine is scheduled to remain on once it is started. If the engine on time is not greater than the on timer threshold T2 at 346, the routine continues to 322 to maintain engine operation. Otherwise, the routine continues to 348 to determine whether the engine temperature has warmed to above the minimum temperature threshold. If not, again the routine continues to 322 to maintain engine operation. If so, the routine continues to 326 to shut down the engine.

In this way, once the engine is turned on, the engine operation is maintained until various conditions are met, such as battery charging, and until it is confirmed that requests related to engine off degradation are no longer present. Thus, once the engine is running (e.g., where the engine was started to charge the battery), it may be continued even after reaching maximum charging if requested to also address an engine degradation related condition, such as in order to burn fuel that has been identified as degraded or in order to circulate fluids or re-lubricate various engine components (see 324, FIG. 4, for example).

Further, as illustrated above, the method carried out by the control system may perform engine starting during different starting conditions responsive to different factors. This may include, during a first engine stopped condition, performing a first start of the engine in response to a battery state of charge, where the engine is started during a first state of charge, and during a second engine stopped condition, performing a second start of the engine in response to an operating parameter, where the engine is started during a second state of charge, the second state of charge higher than the first state of charge, where the initiation of the second start is delayed until a selected event occurs. Further, from the engine running condition, the system may stop the engine in response to the battery state of charge, where the engine is stopped during a third state of charge higher than the first and second states of charge.

In such an example, the second start may be responsive to the engine off duration being greater than a threshold, where the threshold is based on ambient conditions. Thus, the second start may occur even when the SOC is above the minimum starting state of charge SOC1.

As indicated herein, the engine shut down condition may include stopping fuel injection to the engine, stopping rotation of the engine, stopping engine combustion in the cylinders of the engine, and/or combinations thereof.

Figure 4:
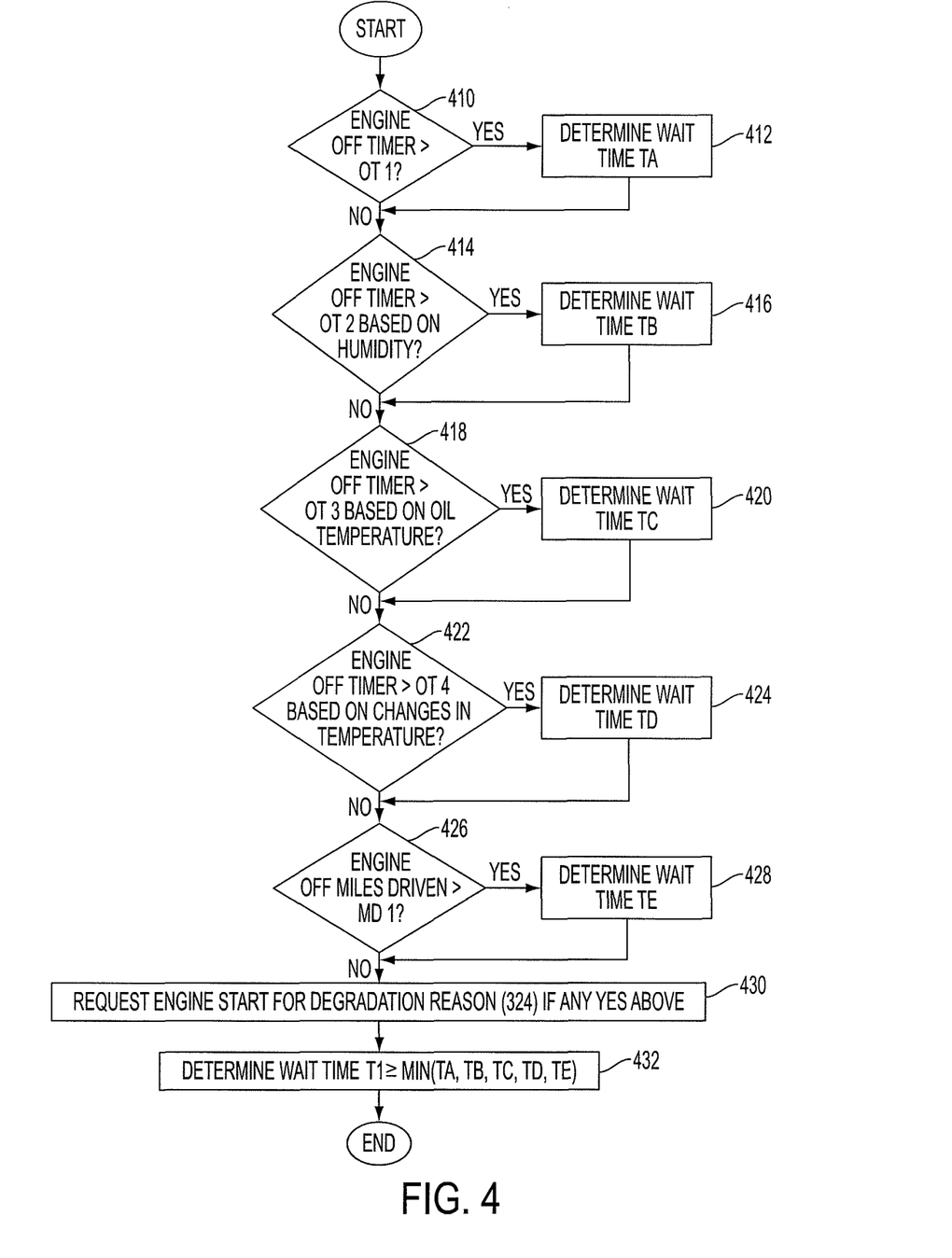

In an alternative example, the various factors described further in FIG. 4 may be used to adjust the minimum SOC threshold SOC1, rather than being considered separately as shown in FIG. 3. In either case, an engine start may be performed at a higher state of charge when potential degradation may occur due to excessive engine off conditions, and further this start may be delayed until selected operating conditions are identified as further described in FIG. 5.

Referring now to FIG. 4, a routine is described for determining whether conditions have been identified in which extended engine off operation may degrade engine components, vehicle components, engine restarting operation, etc. In one particular example, FIG. 4 illustrates an example routine carried out by the control system for determining whether to request an engine start due to issues related to potential degradation caused by excessive engine inactivity, as well as a duration up to which the engine start may be delayed to reduce impact on driver perception. Further, FIG. 4 includes determining an engine on duration that schedules how long the engine is maintained on, once it is started, where the on duration is determined based on various operating conditions, as well as based on the factors that generated the engine on request.

As noted herein, overly lengthy periods of engine inactivity may cause a variety of issues, including: condensation of water into the engine, transmission (if present), fuel tank, or other components; corrosion of moving parts; drain-down of oil systems, and air leakage into hydraulic systems, including hydraulic valve lash adjusters, hydraulic variable camshaft timing actuators, etc.; drain-down of the fuel system and/or fuel rail; air leakage into the fuel system and/or fuel rail; oil and/or coolant leakage past rotating seals; stale fuel, or fuel inappropriate to the season (as fuel formulations may vary depending on the season, winter, summer, etc.). Thus, even if an operator plugs in the vehicle every day and rarely drives long enough to deplete the battery charge to a level where engine operation is performed to charge the battery (SOC<SOC1, for example), the above conditions may occur. Specifically, the vehicle may experience rough engine starts, engine stalls, excessive start-up exhaust emissions, lighting of MIL (Malfunction Indicator Light or "Check Engine" light), or even mechanical damage to the engine and related systems. As such, by considering one or more of the conditions that may generate such effects, the engine may be started even when the state of charge does not generate an engine starting request, as illustrated in the example of FIG. 4

First, in 410, the routine determines whether the engine off timer is greater than a first threshold OT1, which represents the maximum time beyond which the engine can be maintained off. The engine off time may be counted differently depending on whether the vehicle is operating, or based on conditions of the engine off operation. For example, the timer could account for vehicle operation time separately from parked time, for example with a weighted sum.

The threshold OT1 may be set as an outer limit so that even if no other conditions request an engine start, a start will still be periodically requested to reduce potential for degradation. If so, the routine continues to 412 to determine a first wait time (TA that can be tolerated when waiting for selected restarting conditions that reduce driver perception of the engine start), and a corresponding on time. The wait time may be from the initiation of the request. In one example, the wait time TA and/or on time may be based on various operating conditions, such as ambient temperature, ambient pressure, state of charge, etc. For example, the determined wait time may be lengthened when the vehicle is operating with a battery SOC significantly above SOC1, such as 20% above SOC1.

Next, in 414, the routine determines whether the engine off timer is greater than a second threshold OT2, which represents the time beyond which corrosion of moving components may occur due to water condensation. The threshold OT2 (and thus the engine start) may be based on ambient humidity and/or temperature. If the answer to 414 is yes, the routine continues to 416 to determine a second wait time (TB that can be tolerated when waiting for selected restarting conditions that reduce driver perception of the engine start) and a second engine on time. In one example, the wait time TB and/or on time may be based on various operating conditions, such as ambient temperature, ambient pressure, state of charge, etc. For example, the determined wait time may be lengthened when the vehicle is operating with a battery SOC significantly above SOC1, such as 20% above SOC1.

Next, in 418, the routine determines whether the engine off timer is greater than a fourth threshold OT3, which represents the time beyond which engine oil may drain from selected components. The threshold OT3 (and thus the engine start) may be based on ambient temperature, as increased temperature may increase oil viscosity and increase draining (thus, the threshold OT3 may decrease at higher ambient temperatures). If the answer to 418 is yes, the routine continues to 420 to determine a third wait time (TC that can be tolerated when waiting for selected restarting conditions that reduce driver perception of the engine start) and third engine on time. In one example, the wait time TC and/or on time may be based on various operating conditions, such as ambient temperature, ambient pressure, state of charge, etc. For example, the determined wait time may be lengthened when the vehicle is operating with a battery SOC significantly above SOC1, such as 20% above SOC1.

Next, in 422, the routine determines whether the engine off timer is greater than a fourth threshold OT4, which represents the time beyond which fuel degradation may occur due to excessive in tank time, changes in ambient temperature, and/or changes in the season. In one particular, example, the threshold OT4 (and thus the engine start) may be based on ambient temperature, and in particular a degree of change between a minimum and maximum of an ambient condition, and a number of cycles between minimum and maximums of the ambient condition. For example, the control system may monitor changes in ambient temperature over days and/or weeks, and thus determine a degree of potential degradation of fuel stored on-board the vehicle during this time. Thus, if the vehicle has been consistently recharged each night, and driven mostly for relatively short distances, very little fuel may be needed for powering the vehicle, and thus the fuel may be held in the tank for a long time, experiencing many temperature cycles due to the change in temperature of ambient conditions as well as due to vehicle operation. Thus, by monitoring a degree of these daily changes, and the number of cycles of such changes, it may be possible to determine more accurately when fuel degradation may occur, and in turn schedule engine operation to consume fuel by starting and operating the engine based on these factors, it is possible to maintain consistent engine starting.

If the answer to 422 is yes, the routine continues to 424 to determine a fourth wait time (TD that can be tolerated when waiting for selected restarting conditions that reduce driver perception of the engine start) and/or on time. In one example, the wait time TD and/or on time may be based on various operating conditions, such as ambient temperature, ambient pressure, state of charge, etc. For example, the determined wait time may be lengthened when the vehicle is operating with a battery SOC significantly above SOC1, such as 20% above SOC1.

Next, in 426, the routine determines whether the engine off miles driven is greater than a threshold MD1. For example, some engine off issues may be a function of vibration during vehicle operation, which could be inferred from miles driven, or measured with accelerometers (e.g. sensors used for electronic stability control or rob stability control). The threshold MD1 (and thus the engine start) may be based on the vehicle acceleration, rough road indications (e.g., as indicated from vertical acceleration and/or lateral acceleration), etc. If the answer to 426 is yes, the routine continues to 428 to determine a fifth wait time (TE that can be tolerated when waiting for selected restarting conditions that reduce driver perception of the engine start) and fifth engine on time. In one example, the wait time TE and/or on time may be based on various operating conditions. For example, the determined wait time may be lengthened when the vehicle is operating with a battery SOC significantly above SOC1, such as 20% above SOC1.

When any one of the determinations of 410, 414, 418, 422, and 426 indicate that conditions may be present where degradation may occur (e.g., because a timer has reached past the threshold), an engine start request is generated, and the engine on time and wait time are selected based on which factor requested the engine start. Then, at 430, the routine generates the engine start request based on one or more of the determinations (see 324, FIG. 3). Further, in 432, in the event that multiple conditions are identified (and multiple wait times and/or engine on times are determined), the routine determines a minimum wait time of the determined wait times, as well as a maximum engine on time as the maximum of the determined on times. Thus, in one example where an engine start requested is generated based on both ambient humidity as well as the number of miles driven, the engine wait time is selected as the smaller of the ambient humidity based wait time and the number of miles based wait time, so that the condition needing early attention is addressed through an engine start. Likewise, the engine on time is selected as the longer of the ambient humidity based on time and the number of miles based on time, so that the condition needing greater engine operation is addressed.

In this way, it is possible to monitor vehicle operation and identify when one or more of the above particular modes of degradation occur, and further to request an engine start in response thereto. Further, by providing an indication of the urgency of such a request (e.g., via the determined allowable waiting time), it is possible to prioritize the engine start when needed, and allow additional delay when such delay can be accommodated. This enables the start to be better aligned with masking conditions to improve driver comfort. Further, rather than providing an adjusted allowable wait time based on operating conditions, the routine may modify the threshold for the conditions selected for masking engine starting. For example, if the engine start is delayed until the vehicle speed reaches a threshold vehicle speed, the threshold vehicle speed may be reduced as the urgency of the requested start is increased. See FIG. 6 for still further additional details of examples of such operation.

In another alternative embodiment not relying on waiting time, the routine may determine adjustments to the minimum state of charge SOC1 and adjust the value upwards when one or more of the above potential degradation conditions is identified, to thereby force an engine start to be earlier than it otherwise would if such conditions were not present.

Further, as illustrated above, the wait time and/or engine on time may be selected to be different values depending on the reason for requesting the engine start. For example, the engine on time for an engine start related to temperature effects may be longer than the engine on time for an engine start related to ambient humidity effects, since it may take a longer duration to sufficiently use potentially degrading fuel as compared with re-lubricating various components.

Referring now to FIG. 5, a routine is described for determining whether selected engine starting conditions are present that can help mask the engine start (from 328, and 330), where a requested engine start may be delayed until such conditions are identified. Note that as described above with regard to FIG. 3, a request for engine starting due to state of charge (318 or 320) is not subject to such conditions.

In one example, the control system generates a request to the vehicle operator to start the engine. For example, the system may illuminate an indicator light, or generate a text-based message on a message center. Further, the system may display the request via a navigation system or entertainment system. The display could simply inform the driver that an engine start is needed soon, or it could indicate the urgency, e.g. "please start the engine within [X] miles," wherein a lower number of miles indicates increased urgency. By having the operator input a request to start the engine, the start may be perceived as less intrusive and more acceptable by the operator.

Additionally, or alternatively, the control system may determine when to start the engine, either completely without driver intervention, or after the driver has failed to respond to the request. Thus, because an engine start is most likely to be imperceptible when other sources of NVH (Noise, Vibration, and Harshness) are high, for example at high vehicle speeds (tire and wind noise), high acceleration rates (electric motor and/or gear noise), on rough pavement, or when the audio system is playing, the start may be delayed until one or more of the above conditions is present.

Referring now to FIG. 5, at 510, the routine requests operator input to start the engine. Then, at 512, if an operator request is received, the routine indicates that selected engine starting conditions are identified at 514 and an engine start may be carried out at 322. Otherwise, the routine continues to 516 to determine whether vehicle speed is greater than a threshold (e.g., 60 mph), and if so continue to 514. Specifically, increased vehicle speed may be used to mask an engine start since it is likely to be sustained for sufficient time to start the engine and allow the engine to warm-up sufficiently (e.g., highway driving). Also such operation may require higher power levels, therefore the engine output can be used efficiently even if the battery is fully charged.

When the answer to 516 is no, the routine continues to 518 to determine whether vehicle acceleration is greater than a threshold (and/or if vehicle wheel torque is greater than a threshold), and if so, continue to 514. An increase in vehicle acceleration rate may also utilize high power levels, and therefore the engine output can be used efficiently even if the battery is fully charged. However, as high acceleration may occur for shorter duration, this condition may be selected with less preference than the vehicle speed threshold. For example, only after a sufficiently high vehicle speed has failed to occur would the control system consider triggering an engine start responsive to acceleration.

When the answer to 518 is no, the routine continues to 520 to determine whether rough road surface (e.g., rough pavement) is present (and the vehicle is traveling along the road at greater than a minimum speed, such as 30 mph), as driving on such a surface may effectively mask engine starting and continued operation. However, the duration of such a road surface may be unpredictable and thus again starting under such conditions may be made a lower priority than starting at high vehicle speeds as indicated at 516.

When the answer to 520 is no, the routine continues to 522 to determine whether the audio system is in operation and volume is greater than a threshold. Audio system operation may be effective at masking engine starting and engine operation, but as with rough road, the duration may be unpredictable and it is not correlated to power demand. Again, this condition may be set to a lower priority than the determination of 516, such that only after vehicle speed has not reached the threshold of 516 for a specified duration does the control system consider the conditions of 520 to enable and mask an engine start and continued engine operation.

While the above examples illustrate one approach, various modifications may be included. For example, the control system may account for measured or inferred battery State of Charge (SOC) in identifying the selected conditions of FIG. 5. For example, engine starts may be delayed at higher SOC, or initiated sooner at lower SOC, so that the engine output can be used efficiently, as also indicated with regard to the waiting time in FIG. 4. Such operation may also increase engine start predictability, because the operator expects the engine to start at lower SOC. Another predictability factor is that engine starts in response to specific events, such as high vehicle speed, are likely to be more acceptable to the operator than engine starts which appear random to the driver.

If none of the conditions are present, the routine continues to 524 to so indicate and thus the routine may continue waiting (unless the maximum waiting duration has elapsed, as noted with regard to FIG. 4).

In this way, it is possible to make engine starts predictable, to make them less perceptible as possible, and to reduce the efficiency penalty of engine operation, Referring now to FIG. 6, a routine is described determining how long to schedule the engine operation when requested from one of the determinations of FIG. 4, and further when to stop such engine operation. In one example, the engine is scheduled to continue operation for a pre-determined minimum time, and/or until a pre-determined minimum temperature is attained (e.g. oil or coolant temperature). If battery SOC is low, the engine may continue to run until a minimum SOC is achieved, in order to mimic an engine operation event initiated by low SOC (e.g., SOC<SOC1) and make the engine operation appear more predictable to the operator. Further, the length of engine operation may be shortened at high SOC conditions to reduce degradation of the battery.

Further, in one example, the length of engine operation may be determined based on the source of the engine start request, such as described with regard to FIG. 4 in which different potential degradation conditions generate different required engine on durations. In another approach, the on time threshold may be determined as described in FIG. 6, in which the on time is set based on battery SOC and an amount of fuel stored on-board the vehicle (or until a predetermined amount of fuel is used by the engine).

First, at 610, the routine determines a threshold for engine on operation (such as the threshold T2 of 346) based on the current battery SOC at which the engine was started. If the SOC was low, the duration may be increased, and vice versa. Further, at 612, the routine adjusts the threshold based on the amount of fuel stored in the vehicle. Specifically, if the engine start was requested due to degradation of fuel, then the threshold T2 is increased for higher amounts of stored fuel in order to better purge potentially degraded fuel from the tank.

Note that the example process flows described herein can be used with various engine and/or vehicle system configurations. The process flows described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-8, V-10, V-12, opposed 4, and other engine types. The subject matter of the present disclosure includes all novel and non-obvious combinations and subcombinations of the various systems and configurations, and other features, functions, and/or properties disclosed herein.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure,

The invention claimed is:

1. A method for controlling a plug-in hybrid vehicle having an engine, the method carried out by a control system, comprising:

during a first engine stopped condition, performing a first start of the engine in response to a battery state of charge (SOC), where the engine is started during a first SOC;

during a second engine stopped condition, performing a second start of the engine in response an operating parameter, where the engine is started during a second SOC, the second SOC higher than the first SOC;

delaying the performing of the second start until a selected event occurs;

repeatedly delaying engine starts at the second SOC to correlate to the selected event; and performing a first stop of the engine in response to the battery SOC, where the engine is stopped during a third SOC higher than the first and second SOCs.

2. The method of claim 1 wherein the selected event includes vehicle speed greater than a threshold.

3. The method of claim 1 wherein the selected event includes vehicle acceleration greater than a threshold.

4. The method of claim 1 wherein the selected event includes vehicle vibration, including vertical acceleration and/or lateral acceleration, greater than a threshold.

5. The method of claim 1 wherein the selected event includes vehicle wheel torque greater than a threshold.

6. The method of claim 1 wherein the second start is responsive to an engine off duration being greater than a threshold, the threshold based on ambient conditions.

7. The method of claim 6 wherein the ambient conditions include ambient humidity.

8. The method of claim 6 wherein the ambient conditions include a degree of change between a minimum and maximum of an ambient temperature, or a number of cycles between the minimum and maximum of the ambient temperature.

9. The method of claim 6 wherein the selected event is based on the battery SOC.

10. The method of claim 1 further comprising, performing a second stop of the engine following the second start responsive to a duration of engine operation following the second start.

11. The method of claim 1 further comprising, performing a second stop of the engine following the second start responsive to engine temperature being greater than a temperature threshold.

12. The method of claim 1 further comprising, performing a second stop of the engine following the second start responsive to an amount of fuel being used.

13. A method for controlling a plug-in hybrid vehicle having an engine, the method carried out by a control system of the vehicle, comprising:
   starting and stopping the engine in response to a battery state of charge (SOC), where the engine is started in response to the SOC being below a first SOC and stopped in response to the SOC being above a second, higher, SOC;
   generating an engine starting request in response to a duration of an engine off condition even when the SOC is above the first SOC; and
   starting the engine in response to the engine starting request only after selected conditions occur or after a first threshold duration elapses from the initiation of the request, where the first threshold duration is based on operating conditions, and continuing operation of the engine until the engine operates for a second threshold duration, where the second threshold duration is varied based on which conditions generated the engine starting request, including ambient conditions.

14. The method of claim 13 wherein when the request is generated responsive to ambient humidity, the second threshold duration is set to a first duration, and when the request is generated responsive to ambient temperature, the second threshold duration is set to a second duration different from the first duration.

* * * * *